United States Patent
Asai et al.

(10) Patent No.: US 8,342,205 B2
(45) Date of Patent: Jan. 1, 2013

(54) SLIDE TYPE VALVE

(75) Inventors: Naoya Asai, Nagoya (JP); Hiroyuki Sugiura, Nagoya (JP)

(73) Assignee: Takasago Electric, Inc., Aichi (JP)

( * ) Notice: Subject to any disclaimer, the term of this patent is extended or adjusted under 35 U.S.C. 154(b) by 359 days.

(21) Appl. No.: 12/662,238

(22) Filed: Apr. 7, 2010

(65) Prior Publication Data

US 2010/0258756 A1    Oct. 14, 2010

(30) Foreign Application Priority Data

Apr. 9, 2009  (JP) .................................. 2009-095016

(51) Int. Cl.
*F16K 11/065* (2006.01)

(52) U.S. Cl. .................... 137/625.48; 251/174; 251/196; 73/863.73

(58) Field of Classification Search ............. 137/625.48; 251/174, 176, 193, 195, 196; 73/863.73, 73/863.86

See application file for complete search history.

(56) References Cited

U.S. PATENT DOCUMENTS

| | | | | |
|---|---|---|---|---|
| 3,160,015 A | * | 12/1964 | Charlton et al. | 73/863.73 |
| 3,521,674 A | * | 7/1970 | Dodson et al. | 137/625.48 |
| 3,570,540 A | * | 3/1971 | McInnes et al. | 137/625.48 |
| 3,776,276 A | * | 12/1973 | Stiltner | 137/625.18 |
| 3,933,165 A | * | 1/1976 | Budzak et al. | 137/625.48 |
| 4,351,193 A | * | 9/1982 | Colombo et al. | 73/864.82 |
| 4,579,143 A | * | 4/1986 | Rollins et al. | 137/625.48 |
| 4,601,311 A | * | 7/1986 | Acker | 137/625.66 |
| 4,790,393 A | * | 12/1988 | Larronde et al. | 175/40 |
| 5,735,501 A | * | 4/1998 | Maurer et al. | 251/85 |

FOREIGN PATENT DOCUMENTS

| | | |
|---|---|---|
| JP | 2008-051148 A | 3/2008 |
| JP | 2009-002383 A | 1/2009 |

\* cited by examiner

*Primary Examiner* — John Fox
(74) *Attorney, Agent, or Firm* — Edwards Wildman Palmer LLP; James E. Armstrong, IV; George N. Chaclas

(57) ABSTRACT

The slide type valve of the present invention has a structure in which a movable flowpath forming member is pressed toward a slidable sealing member by use of a spring member and in which the load of the slidable sealing member received from the movable flowpath forming member becomes equal to a constant spring load determined by a spring force of the spring member. Additionally, an attachment member holding the movable flowpath forming member that is movable to the fixed flowpath forming member has a housing hole whose shape substantially coinciding with the shape of the movable flowpath forming member. The movable flowpath forming member is housed in the housing hole so as to be slidable in a direction perpendicular to the first end surface of the fixed flowpath forming member, and, accordingly, the load distribution is uniformed both in a first seal sliding surface and in a second seal sliding surface of the slidable sealing member. Additionally, a third flowpath is formed to follow one direction so as to reach the second seal sliding surface from the first seal sliding surface, and, as a result, a pressure loss in the flowpath is minimized.

2 Claims, 8 Drawing Sheets

SLIDE TYPE VALVE

BACKGROUND OF THE INVENTION

1. Field of the Invention

This invention relates to a slide type valve that is used in, for example, a chemical test apparatus, an environmental analysis apparatus, or a biotechnology research instrument and that is applied to, for example, a small slide type solenoid valve capable of opening and closing flowpaths through which liquid specimens or liquid reagents flow or a small injection valve capable of performing switching between flowpaths.

2. Description of Related Art

Improvement in accuracy, improvement in testing speed, minimization of specimens and reagents, device downsizing, and so forth are the most important issues to be achieved in various analytical devices, such as a chemical test apparatus, an environmental analysis apparatus, and a biotechnology research instrument, and, as a result, a solenoid valve that controls fluids used in such analytical devices has been required to be improved in performance. In particular, the amount of change in internal volume caused by opening or closing a valve disc, i.e., the pumping volume exerts influence on a fine control operation of specimens or reagents resulting from the minimization of a valve, and therefore it is absolutely imperative to minimize or zero the pumping volume in order to increase the accuracy of the analytical devices.

Accordingly, as disclosed by Japanese Published Patent Application No. 2008-51148, A, the present applicant has proposed a slide type solenoid valve capable of having a pumping volume of zero, capable of being reduced in device size, capable of being produced at low cost, and capable of being easily controlled.

This slide type solenoid valve includes a flowpath forming member that has flowpaths, a slidable sealing plate that is disposed slidably with respect to the flowpath forming member at a position of the flowpaths of the flowpath forming member and that has a flowpath-opening port portion communicable with the flowpaths and flowpath-closing wall portions capable of closing the flowpaths, a return-to-origin means that returns the slidable sealing plate from an advanced position to an original position, and a solenoid that advances the slidable sealing plate from the original position to the advanced position. The slidable sealing plate opens and closes the flowpaths by means of the flowpath-opening port portion and the flowpath-closing wall portions in accordance with the original position and the advanced position, or performs switching between the flowpaths.

However, the flowpath forming member of the slide type solenoid valve is structured by horizontally arranging two intermediate plates side by side between a first flowpath forming member and a second flowpath forming member and by integrally uniting the first flowpath forming member, the second flowpath forming member, and the intermediate plates together by use of bolts and nuts. The disk-shaped slidable sealing plate and a square holding plate are structured to be disposed in a space that is defined between the two intermediate plates and that penetrates in the up-down direction. In other words, the disk-shaped slidable sealing plate is structured to be placed by the first and second flowpath forming members in a sandwich manner and be firmly fixed with the bolts and the nuts, and therefore, depending on the tightening force of the bolts and nuts, variation is liable to be caused in gap dimensions between the first and second flowpath forming members. Therefore, a conventional problem resides in the fact that the slidable sealing plate has difficulty in keeping the sealing pressure of the sealing plate at a constant level during manufacture, and is unsuitable for mass production.

Furthermore, in Japanese Published Patent Application No. 2009-2383, A, the present applicant has proposed a slide type solenoid valve capable of being reduced in device size, capable of being produced at low cost, and capable of being easily controlled.

This slide type solenoid valve is structured to include a flowpath forming member that has a first flowpath and an end surface in which a port of the first flowpath is formed, a slidable sealing member that is slidable on the end surface of the flowpath forming member and that has a second flowpath capable of communicating with and closing the port of the first flowpath, an elastic urging means that always applies an elastic pressing force onto the slidable sealing member from a direction perpendicular to the sliding direction of the slidable sealing member and that presses the slidable sealing member against the end surface, a return-to-origin means that returns the slidable sealing member to an original position while applying a return-to-origin force onto the slidable sealing member from a direction along the sliding direction of the slidable sealing member, and a solenoid that moves the slidable sealing member from the original position while applying a driving force onto the slidable sealing member in a direction opposite to that of the return-to-origin force of the return-to-origin means.

However, in this slide type solenoid valve, an elastic pressing force is exerted on the slidable sealing member by the elastic urging means from a direction perpendicular to the sliding direction. Therefore, although this slide type solenoid valve has the advantage of being capable of easily keeping the sealing pressure of the slidable sealing member at a constant level and hence being suitable for mass production, this slide type solenoid valve still has the problem of being liable to cause a great pressure loss in a fluid flowing through the flowpath because the second flowpath of the slidable sealing member is formed of a return flowpath.

SUMMARY OF THE INVENTION

It is an object of the present invention to provide a slide type valve capable of keeping the sealing pressure of a slidable sealing member at a constant level during manufacture, hence capable of being mass-produced as a valve having invariable, constant quality, and capable of minimizing a pressure loss that is liable to occur in flowpaths.

The object of the present invention can be achieved by the slide type valve structured as follows.

In detail, the slide type valve of the present invention includes a fixed flowpath forming member that has a first end surface and a first flowpath formed of at least one flowpath and in which one end of the first flowpath is opened at the first end surface; an attachment member that has a housing hole at a part of the attachment member facing the first end surface and that is attached to the fixed flowpath forming member from a side of the first end surface; a movable flowpath forming member that has an external shape substantially coinciding with a shape of the housing hole, that is housed in the housing hole so as to be slidable in a direction perpendicular to the first end surface, and that additionally has a second end surface facing the first end surface in a parallel manner and a second flowpath formed of at least one flowpath; a slidable sealing member that is disposed between the first end surface and the second end surface, that is slidable both on the first end surface and on the second end surface, and that has a first seal sliding surface being in slidable contact with the first end surface, a second seal sliding surface being in slidable contact with the second end surface, and a third flowpath formed of at least one flowpath one end of which is opened at the first seal sliding surface and an opposite end of which is opened at the second seal sliding surface; a spring member that presses the movable flowpath forming member so that the second end surface of the movable flowpath forming member is tightly pressed against the second seal sliding surface of the slidable sealing member; and an actuator that rectilinearly moves the slidable sealing member between an original position and a predetermined position. In the slide type valve, a communication pattern among the first flowpath, the third flowpath, and the second flowpath is set according to a position of the slidable sealing member.

According to the present invention, the movable flowpath forming member has a shape substantially coinciding with the shape of the housing hole of the attachment member, and is housed in the housing hole so as to be slidable in a direction perpendicular to the first end surface of the fixed flowpath forming member, and therefore the load distribution is uniformed both in the first seal sliding surface and in the second seal sliding surface of the slidable sealing member. Therefore, the slidable sealing member can be smoothly slid while keeping the sealing pressure of the slidable sealing member at a constant level.

Additionally, the third flowpath of the slidable sealing member is formed to follow one direction so as to reach the second seal sliding surface from the first seal sliding surface, and therefore the pressure loss of a fluid in the flowpath can be minimized.

Additionally, the movable flowpath forming member is pressed by the spring member, and therefore the load of the slidable sealing member received from the movable flowpath forming member becomes equal to a constant spring load determined by the spring member. Therefore, the sealing pressure of the slidable sealing member can be easily set at a constant level during manufacture, and a valve having invariable, constant quality can be mass-produced.

Preferably, in the slide type valve mentioned above, the fixed flowpath forming member has a first projection that protrudes toward the movable flowpath forming member and on which the first end surface is formed; the movable flowpath forming member has a second projection that protrudes toward the first projection and on which the second end surface is formed; and the first end surface and the second end surface are smaller in area than the first seal sliding surface and the second seal sliding surface of the slidable sealing member, respectively, and maintain a state of slidable contact with the first seal sliding surface and with the second seal sliding surface, respectively, during a rectilinear movement of the slidable sealing member.

With this slide type valve, the load distribution can be made more uniform in the first seal sliding surface and in the second seal sliding surface, and it becomes possible to use the spring member having a comparatively small elastic urging force, and therefore the life of the valve can be prolonged by reducing the frictional resistance caused when the slidable sealing member slides.

Thus, with the slide type valve structured as above, the sealing pressure of the slidable sealing member can be easily kept at a constant level during manufacture, and the valve having constant quality can be mass-produced, and a pressure loss that is liable to occur in flowpaths can be minimized.

DESCRIPTION OF THE PREFERRED EMBODIMENTS

Figure 1:
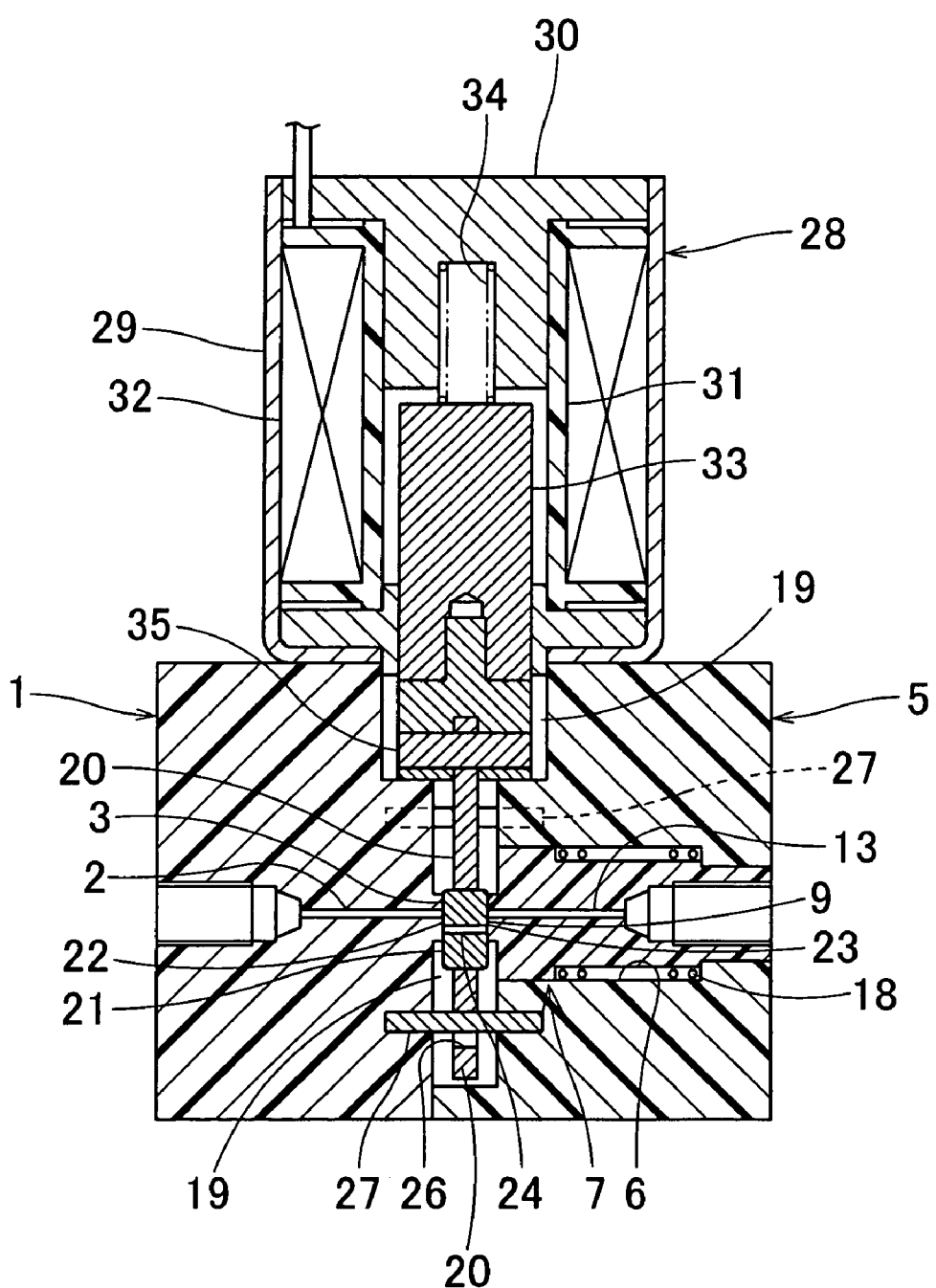
FIG. 1 is a sectional view of a two-way valve (ON-OFF valve) according to a first embodiment of a slide type valve of the present invention, showing a state in which a slidable sealing member is in an original position.

The present invention will be hereinafter described based on embodiments shown in the accompanying drawings. The present invention is not limited to these embodiments. All modifications to elements recited in the appended claims or equivalents of these elements fall within the scope of the claims.

FIG. 1 to FIG. 4 show a small, slide type solenoid valve that serves as a slide type valve and that is a first embodiment of the present invention. This slide type solenoid valve is used in various analytical devices, and is a normally-closed two-way valve (ON-OFF valve).

The slide type solenoid valve includes a fixed flowpath-forming member 1, and this fixed flowpath forming member 1 has a first flowpath 2 that communicates with a port. The first flowpath 2 consists of only one flowpath, and one end of the first flowpath 2 is opened at a first end surface 3 of the fixed flowpath forming member 1. The first end surface 3 is formed on a first projection 4 that protrudes toward a movable flowpath-forming member 7 described later.

An attachment member 5 is disposed to face the first end surface 3 of the fixed flowpath forming member 1, and is firmly fixed to the fixed flowpath forming member 1 with metal fasteners (not shown). Preferably, the fixed flowpath forming member 1 and the movable flowpath forming member 7 are made of materials that are comparatively hard and excellent in corrosion resistance, such as PEEK, PPS, or ceramics.

Figure 3:
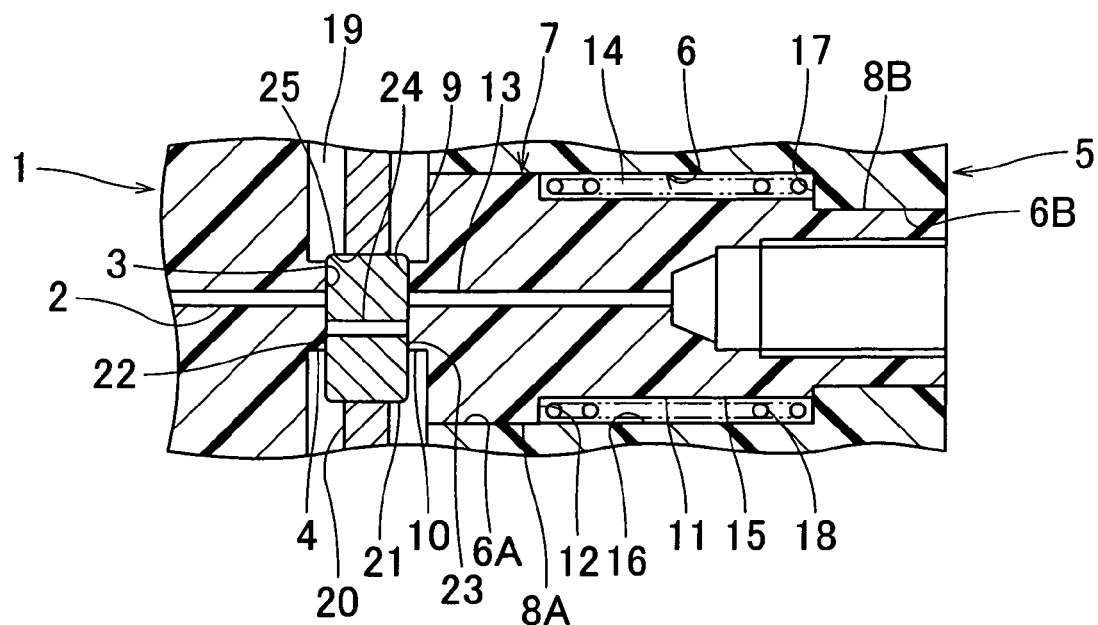
FIG. 3 is an enlarged view of a main part of FIG. 1.

The attachment member 5 has a substantially cylindrical housing hole 6 that is bored therethrough and that is formed at its portion facing the first end surface 3. The movable flowpath forming member 7 has an external shape that substantially coincides with the shape of the housing hole 6 of the attachment member 5, and is housed in the housing hole 6 so as to be slidable in a direction perpendicular to the first end surface 3. The movable flowpath forming member 7 has a large-diameter sliding part 8A in parallel with its moving direction. The large-diameter sliding part 8A has an outer diameter substantially equal to the inner diameter of a large diameter part 6A of the housing hole 6, and is in slidable contact with the large diameter part 6A of the housing hole 6. The large-diameter sliding part 8A has a second end surface 9 at its portion facing the first end surface 3. As shown in FIG. 3, the second end surface 9 is formed on a second projection 10 of the movable flowpath forming member 7 that protrudes toward the first projection 4 of the fixed flowpath forming member 1.

The first projection 4 and the second projection 10 are portions that serve to seal and hold a slidable sealing member 21 described later, and, instead of the first and second projections 4 and 10, sealing members of another type may be fixedly placed at the same positions, respectively.

Additionally, as shown in FIG. 3, the movable flowpath forming member 7 has a small diameter part 11 whose outer diameter is smaller than the inner diameter of the housing hole 6. The large-diameter sliding part 8A and the small diameter part 11 are contiguous to each other via an annular stepped surface 12. The movable flowpath forming member 7 additionally has a small-diameter sliding part 8B. The small-diameter sliding part 8B has an outer diameter substantially equal to the inner diameter of the small diameter part 6B of the housing hole 6, and is slidable on the small diameter part 6B of the housing hole 6.

The movable flowpath forming member 7 additionally has a second flowpath 13. The second flowpath 13 consists of only one flowpath, and one end of the second flowpath 13 is opened at the second end surface 9 of the movable flowpath forming member 7. As shown in FIG. 3, a cylindrical spring-housing space 14 is defined by the housing hole 6 and the movable flowpath forming member 7.

In detail, the cylindrical spring-housing space 14 is defined by an outer peripheral surface 15 of the small diameter part 11, an inner peripheral surface 16 of the housing hole 6 facing the outer peripheral surface 15 of the small diameter part 11, the annular stepped surface 12, and an annular spring-bearing seat 17 of the housing hole 6 facing the annular stepped surface 12.

A cylindrical coil spring 18 that serves as a spring member is housed in the spring housing space 14. The coil spring 18 applies a pressing force, by which the movable flowpath forming member 7 is moved in a direction perpendicular to the first end surface 3, onto the movable flowpath forming member 7. A square holding plate 20 and the disk-shaped slidable sealing member 21 held by the holding plate 20 are disposed in a space 19 formed between the fixed flowpath forming member 1 and the attachment member 5.

Figure 2:
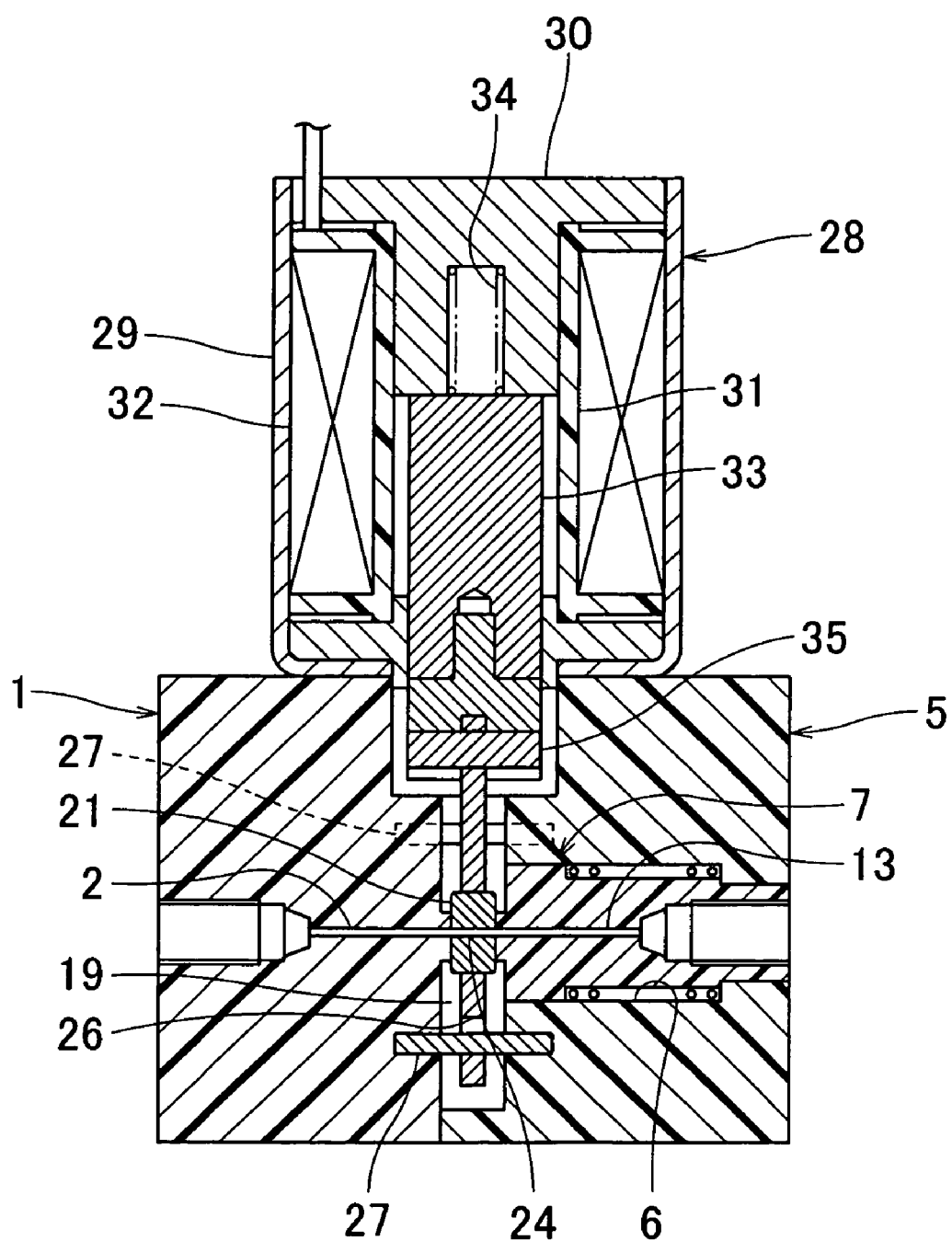
FIG. 2 is a sectional view of the slide type valve, showing a state in which the slidable sealing member has moved from the original position to a predetermined position.

The slidable sealing member 21 is disposed between the first end surface 3 and the second end surface 9 so as to be rectilinearly movable in the up-down direction in FIGS. 1 and 2. The slidable sealing member 21 is slidable on the first end surface 3 and on the second end surface 9, and has a first seal sliding surface 22 being in slidable contact with the first end surface 3 and a second seal sliding surface 23 being in slidable contact with the second end surface 9 as shown in FIG. 3. The first and second end surfaces 3 and 9 are smaller in area than the first and second seal sliding surfaces 22 and 23, respectively, and are structured to maintain a state of slidable contact with the first and second seal sliding surfaces 22 and 23, respectively, during a rectilinear movement of the slidable sealing member 21.

The slidable sealing member 21 additionally has a third flowpath 24. The third flowpath 24 consists of only one flowpath. One end of the third flowpath 24 is opened at the first seal sliding surface 22, whereas the other end of the third flowpath 24 is opened at the second seal sliding surface 23.

Preferably, the slidable sealing member 21 is made of material that is excellent in chemical resistance and that is small in sliding resistance against the first and second end surfaces 3 and 9. The slidable sealing member 21 is made of ceramic fluorine resin, such as tetrafluoroethylene resin, fluorine-containing rubber, EPDM (ethylene-propylene rubber), polyimide, or glass. More preferably, the surface of the slidable sealing member 21 made of fluorine-containing rubber or EPDM rubber is treated with fluorine resin.

As shown in FIG. 3, the holding plate 20 has a circular holding port 25 that holds the slidable sealing member 21, and the slidable sealing member 21 is fixed to the holding port 25 by bonding or press fitting. The thickness of the holding plate 20 is set to be smaller than that of the slidable sealing member 21, and gaps are formed between one surface of the holding plate 20 and the fixed flowpath forming member 1 and between the other surface of the holding plate 20 and the attachment member 5, respectively.

As shown in FIG. 1, the holding plate 20 has a plurality of positioning holes 26 each of which is long in the sliding direction of the slidable sealing member 21 (i.e., in the up-down direction). A positioning pin 27 is inserted in each positioning hole 26. Both ends of each positioning pin 27 are held by horizontal holes bored in the fixed flowpath forming member 1 and the attachment member 5, respectively.

The positioning pin 27 and the positioning hole 26 forbid the slidable sealing member 21 to move downwardly by bringing the upper end of the positioning hole 26 into contact with the positioning pin 27 as shown in FIG. 1. Additionally, the positioning pin 27 and the positioning hole 26 forbid the slidable sealing member 21 to move upwardly by bringing the lower end of the positioning hole 26 into contact with the positioning pin 27 as shown in FIG. 2. The positioning hole 26 and the positioning pin 27 constitute a positioning mechanism.

As shown in FIG. 1, a solenoid 28 serving as an actuator is fixed to the upper surface of the fixed flowpath forming member 1 and to the upper surface of the attachment member 5 by use of metal fasteners not shown.

The solenoid 28 has a hollow cylindrical case 29 that forms a yoke, and a stationary iron core 30 is fixed to an upper opening portion of the case 29. A coil 32 wound on a bobbin 31 is housed and placed on the inner peripheral surface of the case 29. A movable iron core 33 is disposed in a hollow part of the bobbin 31 so as to face the lower surface of the stationary iron core 30 and so as to be movable in the up-down direction. A coil spring 34, which serves as an elastic return member that always applies a downward force onto the movable iron core 33, is disposed between the upper surface of the movable iron core 33 and the lower surface of the stationary iron core 30.

A connection member 35 is connected to the lower end of the movable iron core 33. The connection member 35 is housed in a bottomed cylindrical concave portion formed both on the upper surface of the fixed flowpath forming member 1 and on the upper surface of the attachment member 5, and fixedly holds the holding plate 20.

Next, a description will be given of the operation of the slide type solenoid valve that is a two-way valve structured as above.

When an electric current is not passed through the coil 32 of the solenoid 28, the coil spring 34 downwardly presses the movable iron core 33 by means of a spring force, and the upper end of the positioning hole 26 of the holding plate 20 presses the positioning pin 27 through the connection member 35, and, as a result, the slidable sealing member 21 is in the original position (i.e., the retreated position or the bottom position) as shown in FIG. 1. Therefore, as shown in FIGS. 1 and 3, the slidable sealing member 21 blocks up the space between the first flowpath 2 of the fixed flowpath forming member 1 and the second flowpath 13 of the movable flowpath forming member 7.

When an electric current is passed through the coil 32 of the solenoid 28, a magnetic field is generated in the coil 32, and the movable iron core 33 receives a magnetic attracting force, which is greater than the spring force of the coil spring 34, from the stationary iron core 30. As a result, the movable iron core 33 upwardly moves as shown in FIG. 2.

Figure 4:
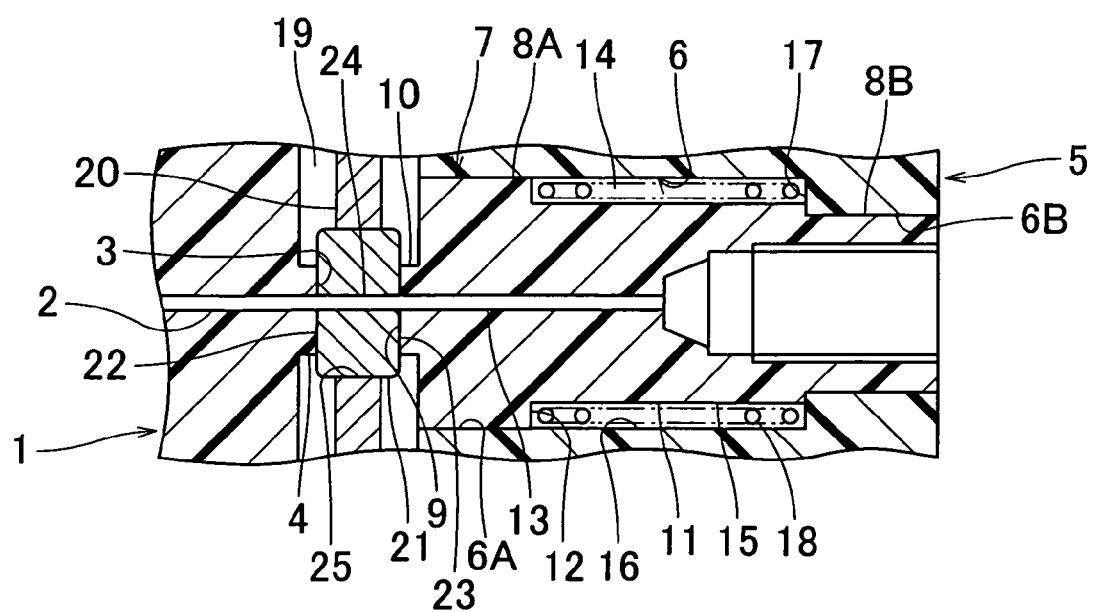
FIG. 4 is an enlarged view of a main part of FIG. 2.
Figure 5A:
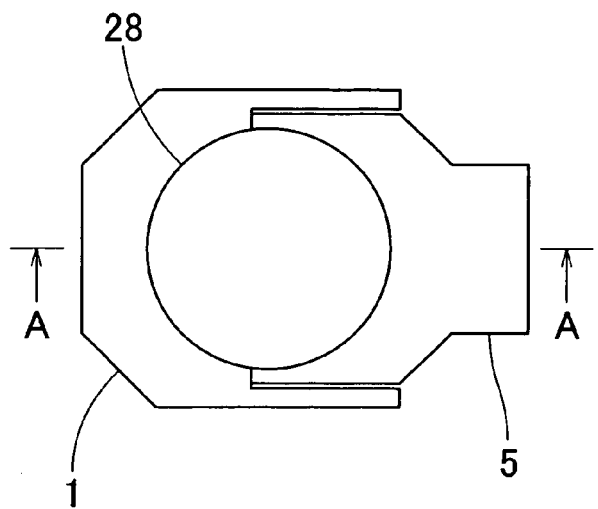
FIG. 5A, FIG. 5B, and FIG. 5C are a plan view, a front view, and a right side view, respectively, of an injection valve according to a second embodiment of the slide type valve of the present invention.
Figure 5B:
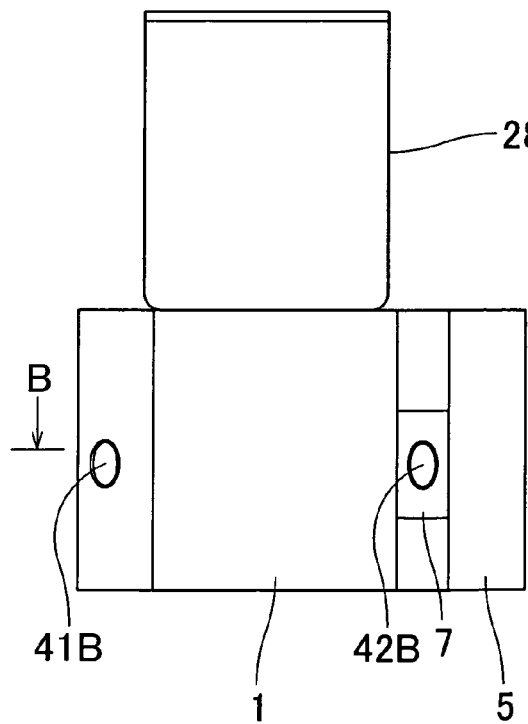
Figure 5C:
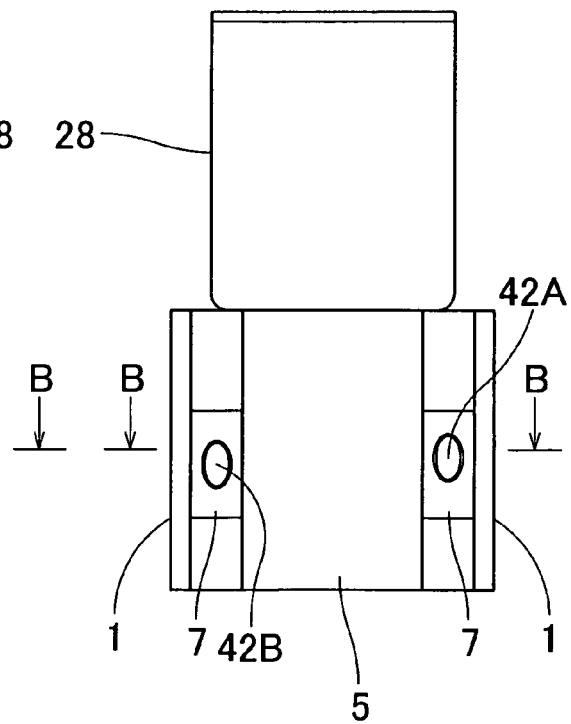

In association with the movement of the movable iron core 33, the slidable sealing member 21 upwardly moves while sliding on the first end surface 3 of the fixed flowpath forming member 1 and on the second end surface 9 of the movable flowpath forming member 7 by means of the connection member 35 and the holding plate 20, and the positioning pin 27 moves while its moving direction is controlled by the positioning hole 26 of the holding plate 20. Thereafter, when the positioning pin 27 comes into contact with the lower end of the positioning hole 26 as shown in FIG. 2, the slidable sealing member 21 stops moving, and is held at the advanced top position. Therefore, as shown in FIGS. 2 and 4, the third flowpath 24 of the slidable sealing member 21 reaches a state of communicating with the first flowpath 2 of the fixed flowpath forming member 1 and communicating with the second flowpath 13 of the movable flowpath forming member 7 between the first flowpath 2 and the second flowpath 13.

On the other hand, when an electric current stops being passed through the coil 32 of the solenoid 28, the magnetic field generated in the coil 32 disappears, and the magnetic attracting force acting on the movable iron core 33 disappears. Therefore, as shown in FIG. 1, the movable iron core 33 is downwardly moved by the spring force of the coil spring 34. In association with the movement of the movable iron core 33, the slidable sealing member 21 downwardly moves while sliding on the first end surface 3 of the fixed flowpath forming member 1 and on the second end surface 9 of the movable flowpath forming member 7 by means of the connection member 35 and the holding plate 20. Thereafter, when the upper end of the positioning hole 26 of the holding plate 20 comes into contact with the positioning pin 27, the slidable sealing member 21 stops moving, and is returned to the retreated bottom position, i.e., to the original position. Therefore, as shown in FIGS. 1 and 3, the slidable sealing member 21 blocks up the space between the first flowpath 2 of the fixed flowpath forming member 1 and the second flowpath 13 of the movable flowpath forming member 7.

As described above, the slide type solenoid valve according to this embodiment is structured to include the fixed flowpath forming member 1 that has the first end surface 3 and the first flowpath 2 consisting of the single flowpath and in which one end of the first flowpath 2 is opened at the first end surface 3, the attachment member 5 that has the housing hole 6 at its part facing the first end surface 3 and that is attached to the fixed flowpath forming member 1 from the side of the first end surface 3, the movable flowpath forming member 7 that has an external shape substantially coinciding with the shape of the housing hole 6, that is housed in the housing hole 6 so as to be slidable in a direction perpendicular to the first end surface 3, and that has the second end surface 9 facing the first end surface 3 in a parallel manner and the second flowpath 13 consisting of the single flowpath, and the slidable sealing member 21 that is disposed between the first end surface 3 and the second end surface 9, that is slidable both on the first end surface 3 and on the second end surface 9, and that has the first seal sliding surface 22 being in slidable contact with the first end surface 3, the second seal sliding surface 23 being in slidable contact with the second end surface 9, and the third flowpath 24 consisting of the single flowpath one end of which is opened at the first seal sliding surface 22 and the other end of which is opened at the second seal sliding surface 23.

Additionally, the coil spring 18 that presses the movable flowpath forming member 7 so that the second end surface 9 of the movable flowpath forming member 7 is tightly pressed against the second seal sliding surface 23 of the slidable sealing member 21 is disposed between the movable flowpath forming member 7 and the attachment member 5. Additionally, the solenoid 28, which has the coil spring 34, which holds the slidable sealing member 21 in the original position by means of an urging force of the coil spring 34 during non-application of an electric current, and which rectilinearly moves the slidable sealing member 21 to a predetermined position while resisting the urging force of the coil spring 34 during application of an electric current, is attached both onto the fixed flowpath forming member 1 and onto the attachment member 5. According to the position of the slidable sealing member 21 based on application or non-application of an electric current onto the solenoid 28, the space between the first flowpath 2 and the second flowpath 13 is allowed to communicate with the first flowpath 2 and with the second flowpath 13 or is allowed to be blocked up, and, accordingly, a communication pattern among the first flowpath 2, the third flowpath 24, and the second flowpath 13 is set.

The slide type solenoid valve that is a two-way valve according to this embodiment is structured to press the movable flowpath forming member 7 by use of the coil spring 18, and therefore the load of the slidable sealing member 21 received from the movable flowpath forming member 7 becomes equal to a constant spring load determined by the coil spring 18, and it is possible to easily mass-produce the slide type valve having stable, constant performance.

Additionally, the movable flowpath forming member 7 has a shape substantially coinciding with the shape of the housing hole 6 of the attachment member 5 and is housed in the housing hole 6 so as to be slidable in a direction perpendicular to the first end surface 3 of the fixed flowpath forming member 1, and therefore the load distribution can be uniformed in the first seal sliding surface 22 and the second seal sliding surface 23 of the slidable sealing member 21. Additionally, the third flowpath 24 is formed to follow one direction so as to reach the second seal sliding surface 23 from the first seal sliding surface 22, and therefore the pressure loss in the flowpath can be minimized.

Additionally, the fixed flowpath forming member 1 has the first projection 4 that protrudes toward the movable flowpath forming member 7 and on which the first end surface 3 is formed. The movable flowpath forming member 7 has the second projection 10 that protrudes toward the first projection 4 and on which the second end surface 9 is formed. The first end surface 3 and the second end surface 9 are smaller in area than the first seal sliding surface 22 and the second seal sliding surface 23, respectively, and maintain a state of slidable contact with the first seal sliding surface 22 and with the second seal sliding surface 23, respectively, during a rectilinear movement of the slidable sealing member 21. Therefore, the load distribution can be made more uniform in the first seal sliding surface 22 and the second seal sliding surface 23, and it is possible to use the coil spring 18 as a spring member having a comparatively small elastic urging force, and the life of the valve can also be prolonged.

Although the coil spring 18 is used as a spring member in the above-mentioned embodiment, a leaf spring whose basal part is fixed to the attachment member 5 may be used instead of the coil spring 18, and may press the movable flowpath forming member 7 against the slidable sealing member 21 in the same way as the coil spring. Additionally, although the slide type solenoid valve according to the above-mentioned embodiment is a normally-closed two-way valve (ON-OFF valve), the present invention can also be easily applied to a normally-open two-way or three-way valve.

FIGS. 5A to 10 show a second embodiment of the present invention, and the slide type solenoid valve according to this embodiment is a small injection valve for use in various analytical devices.

As shown in FIGS. 5A, 5B, 5C, 6, and 7, the injection valve has a fixed flowpath forming member 1. This fixed flowpath forming member 1 has a first flowpath 2. This first flowpath 2 is formed of a first base flowpath 2A through which a base liquid flows and a first sample flowpath 2B through which a sample liquid flows. A first projection 4 that slidably seals and holds the slidable sealing member 21 is erected on the inside of the fixed flowpath forming member 1. Although the first projection 4 is formed of a member differing from the fixed flowpath forming member 1 in, for example, FIG. 6, a part of the fixed flowpath forming member 1 can be formed so as to protrude toward the slidable sealing member 21. Likewise, although the second projection 10 is formed of a member differing from the movable flowpath forming member 7 in, for example, FIG. 6, a part of the movable flowpath forming member 7 can be formed so as to protrude toward the slidable sealing member 21.

Figure 7:
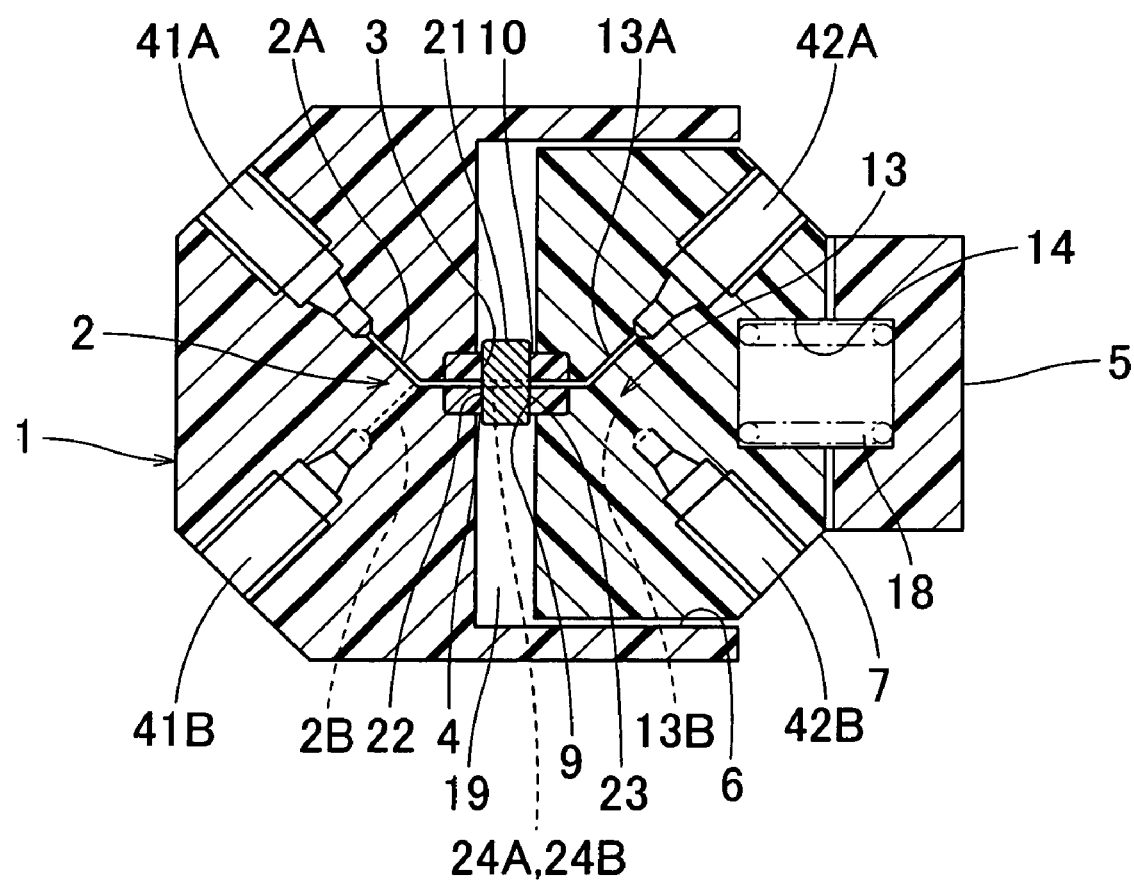
FIG. 7 is a sectional view along line B-B of FIGS. 5B and 5C in a state in which the slidable sealing member is in the original position.

A first end surface 3 is formed on the first projection 4, and one end of the first base flowpath 2A and one end of the first sample flowpath 2B are both opened at the first end surface 3. In other words, the first end surface 3 is formed on the first projection 4 that protrudes toward the movable flowpath forming member 7. As shown in FIG. 7, the other end of the first base flowpath 2A and the other end of the first sample flowpath 2B communicate with a first base port 41A and a first sample port 41B, respectively.

An attachment member 5 is disposed to face the first end surface 3 of the fixed flowpath forming member 1, and is firmly fixed to the fixed flowpath forming member 1 with metal fasteners (not shown). Preferably, the fixed flowpath forming member 1 and the movable flowpath forming member 7 are made of materials that are comparatively hard and excellent in corrosion resistance, such as PEEK, PPS, or ceramics.

The attachment member 5 has a housing hole 6 at its part facing the first end surface 3. The movable flowpath forming member 7 has an external shape that substantially coincides with the shape of the housing hole 6 of the attachment member 5, and is housed in the housing hole 6 so as to be slidable in a direction perpendicular to the first end surface 3. The movable flowpath forming member 7 has a second end surface 9 at its part facing the first end surface 3. The second end surface 9 is formed on the second projection 10 that protrudes toward the first projection 4.

The movable flowpath forming member 7 additionally has a second flowpath 13. The second flowpath 13 is formed of a second base flowpath 13A through which a base liquid flows and a second sample flowpath 13B through which a sample liquid flows. One end of the second base flowpath 13A and one end of the second sample flowpath 13B are both opened at the second end surface 9. As shown in FIG. 7, the other end of the second base flowpath 13A and the other end of the second sample flowpath 13B communicate with the second base port 42A and the second sample port 42B, respectively.

A spring housing space 14 is formed on the central axis line of the movable flowpath forming member 7, and a coil spring 18 serving as a spring member is housed in the spring housing space. The coil spring 18 applies a pressing force, by which the movable flowpath forming member 7 is moved in a direction perpendicular to the first end surface 3, onto the movable flowpath forming member 7.

A square holding plate 20 and the disk-shaped slidable sealing member 21 held by the holding plate 20 are disposed in a space 19 formed between the fixed flowpath forming member 1 and the attachment member 5. The slidable sealing member 21 is disposed between the first end surface 3 and the second end surface 9 so as to be rectilinearly movable in the up-down direction in FIG. 6.

Figure 9:
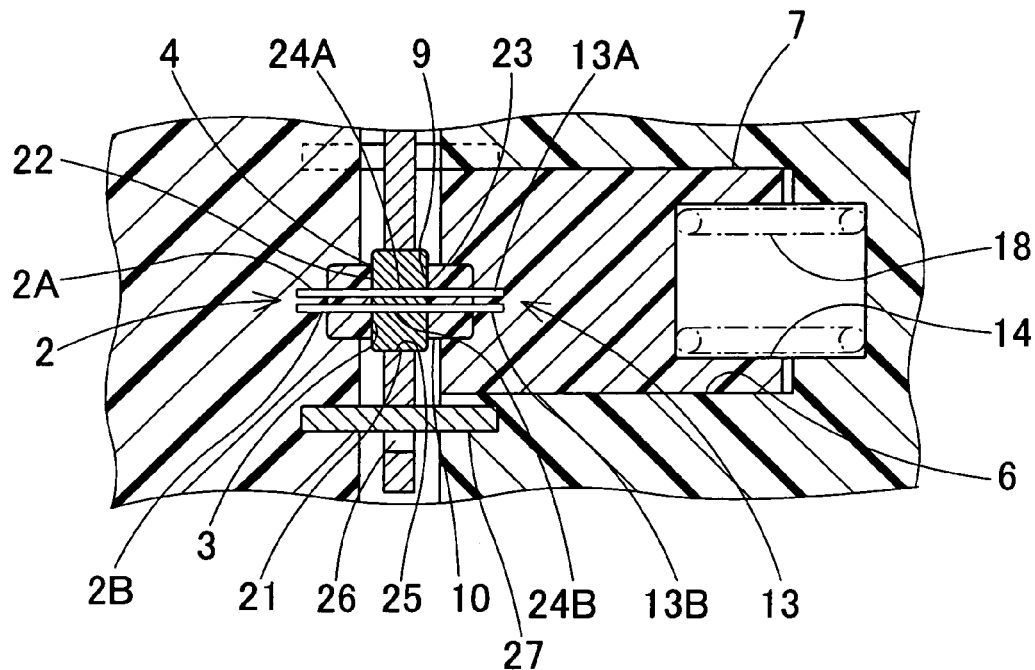
FIG. 9 is an enlarged view of a main part of FIG. 7.

As shown in FIG. 9, the slidable sealing member 21 is slidable on the first end surface 3 and on the second end surface 9, and has a first seal sliding surface 22 being in slidable contact with the first end surface 3 and a second seal sliding surface 23 being in slidable contact with the second end surface 9. The first and second end surfaces 3 and 9 are smaller in area than the first and second seal sliding surfaces 22 and 23, respectively, and are structured to maintain a state of slidable contact with the first and second seal sliding surfaces 22 and 23, respectively, during a rectilinear movement of the slidable sealing member 21.

The slidable sealing member 21 additionally has two flowpaths, i.e., a third flowpath 24A and a third flowpath 24B. One end of the third flowpath 24A and one end of the third flowpath 24B are both opened at the first seal sliding surface 22, whereas the other end of the third flowpath 24A and the other end of the third flowpath 24B are both opened at the second seal sliding surface 23.

Preferably, the slidable sealing member 21 is made of material that is excellent in chemical resistance and that is small in sliding resistance against the first and second end surfaces 3 and 9. The slidable sealing member 21 is made of ceramic fluorine resin, such as tetrafluoroethylene resin, fluorine-containing rubber, EPDM (ethylene-propylene rubber), polyimide, or glass. More preferably, the surface of the slidable sealing member 21 made of fluorine-containing rubber or EPDM rubber is treated with fluorine resin.

Figure 6:
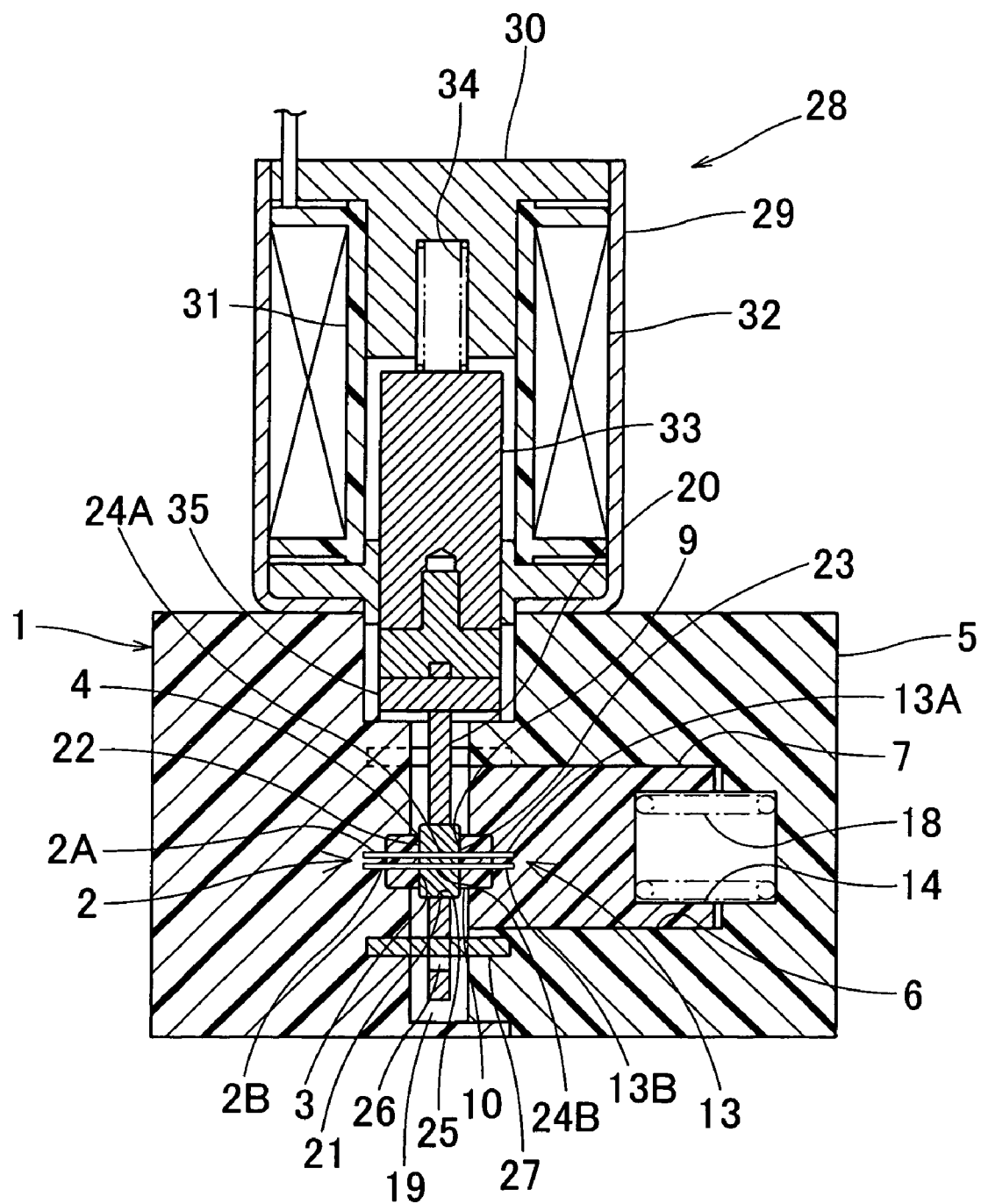
FIG. 6 is a sectional view along line A-A of FIG. 5A in a state in which the slidable sealing member is in the original position.

As shown in FIG. 6, the holding plate 20 has a circular holding port 25 that holds the slidable sealing member 21, and the slidable sealing member 21 is fixed to the holding port 25 by bonding or press fitting. The thickness of the holding plate 20 is set to be smaller than that of the slidable sealing member 21, and gaps are formed between one surface of the holding plate 20 and the fixed flowpath forming member 1 and between the other surface of the holding plate 20 and the attachment member 5, respectively.

The holding plate 20 has a plurality of positioning holes 26 each of which is long in the sliding direction of the slidable sealing member 21. A positioning pin 27 is inserted in each positioning hole 26. Both ends of each positioning pin 27 are held by horizontal holes bored in the fixed flowpath forming member 1 and the attachment member 5, respectively.

Figure 8:
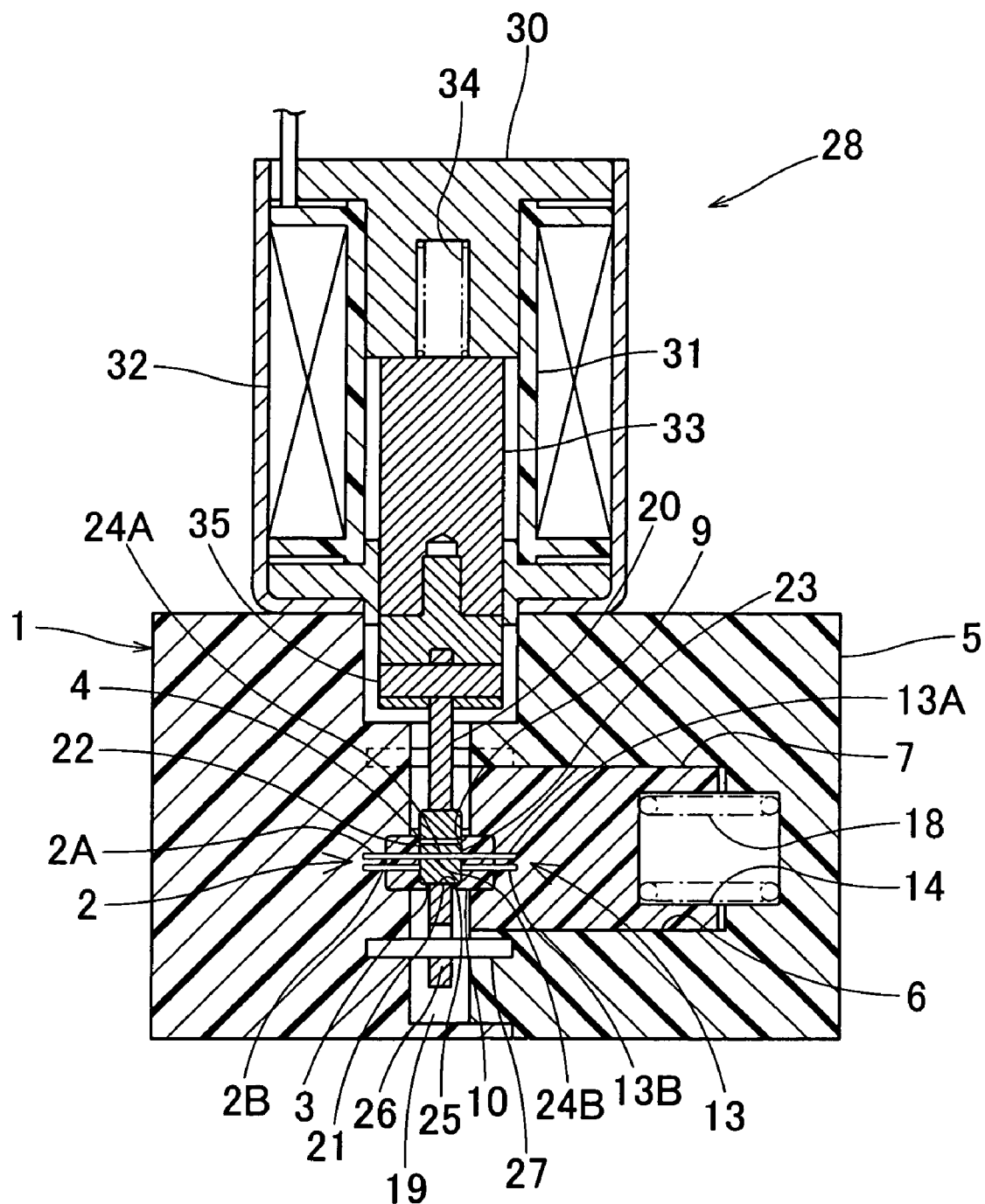
FIG. 8 is a sectional view along line A-A of FIG. 5A in a state in which the slidable sealing member has moved from the original position to a predetermined position.

The positioning pin 27 and the positioning hole 26 forbid the slidable sealing member 21 to move downwardly by bringing the upper end of the positioning hole 26 into contact with the positioning pin 27 as shown in FIG. 6. Additionally, the positioning pin 27 and the positioning hole 26 forbid the slidable sealing member 21 to move upwardly by bringing the lower end of the positioning hole 26 into contact with the positioning pin 27 as shown in FIG. 8. The positioning hole 26 and the positioning pin 27 thus constitute a positioning mechanism.

As shown in FIG. 6, a solenoid 28 serving as an actuator is fixed to the upper surface of the fixed flowpath forming member 1 and to the upper surface of the attachment member 5 by use of metal fasteners not shown.

The solenoid 28 has a hollow cylindrical case 29 that forms a yoke. A stationary iron core 30 is fixed to an upper opening portion of the case 29. A coil 32 wound on a bobbin 31 is housed and placed on the inner peripheral surface of the case 29. A movable iron core 33 is disposed in a hollow part of the bobbin 31 so as to face the lower surface of the stationary iron core 30 and so as to be movable in the up-down direction. A coil spring 34, which serves as an elastic return member that always applies a downward force onto the movable iron core 33, is disposed between the upper surface of the movable iron core 33 and the lower surface of the stationary iron core 30.

A connection member 35 is connected to the lower end of the movable iron core 33. The connection member 35 is housed in a bottomed cylindrical concave portion formed both on the upper surface of the fixed flowpath forming member 1 and on the upper surface of the attachment member 5, and fixedly holds the holding plate 20.

Next, a description will be given of the operation of the injection valve according to the above-mentioned embodiment. When an electric current is not passed through the coil 32 of the solenoid 28, the coil spring 34 downwardly presses the movable iron core 33 by means of its spring force, and the upper end of the positioning hole 26 of the holding plate 20 presses the positioning pin 27 through the connection member 35, and, as a result, the slidable sealing member 21 is in the retreated bottom position, i.e., the original position as shown in FIG. 6.

Therefore, as shown in FIG. 6, the third flowpath 24A of the slidable sealing member 21 is in a state of communicating with the first base flowpath 2A of the fixed flowpath forming member 1 and with the second base flowpath 13A of the movable flowpath forming member 7. On the other hand, the third flowpath 24B that is the other one of the two flowpaths is in a state of communicating with the first sample flowpath 2B of the fixed flowpath forming member 1 and with the second sample flowpath 13B of the movable flowpath forming member 7. The third flowpath 24B is filled with a sample liquid.

Figure 10:
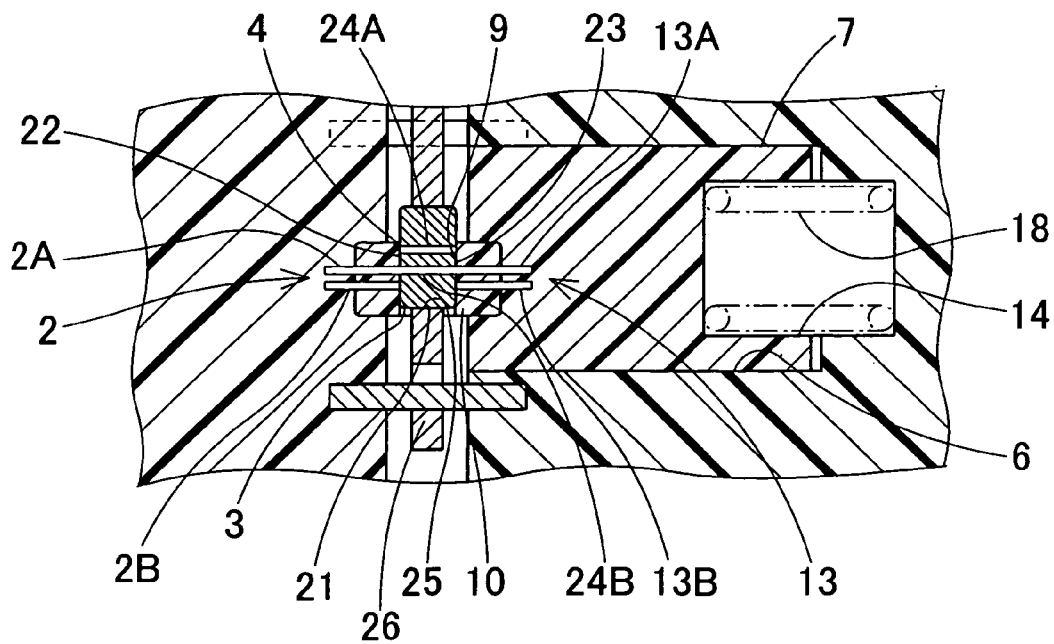
FIG. 10 is an enlarged view of a main part of FIG. 8.

When an electric current starts being passed through the coil 32 of the solenoid 28, a magnetic field is generated in the coil 32, and the movable iron core 33 receives a magnetic attracting force, which is greater than the spring force of the coil spring 34, from the stationary iron core 30. As a result, the movable iron core 33 upwardly moves as shown in FIGS. 8 and 10. In association with the movement of the movable iron core 33, the slidable sealing member 21 upwardly moves while sliding on the first end surface 3 of the fixed flowpath forming member 1 and on the second end surface 9 of the movable flowpath forming member 7 by means of the connection member 35 and the holding plate 20, and the positioning pin 27 moves while its moving direction is controlled by the positioning hole 26 of the holding plate 20 as shown in FIGS. 8 and 10, and, when the positioning pin 27 comes into contact with the lower end of the positioning hole 26, the slidable sealing member 21 stops moving, and is held at the advanced top position.

Therefore, as shown in FIGS. 8 and 10, the third flowpath 24B of the slidable sealing member 21 reaches a state of communicating with the first base flowpath 2A of the fixed flowpath forming member 1 and communicating with the second base flowpath 13A of the movable flowpath forming member 7, and a slight amount of sample liquid contained in the third flowpath 24B is substituted for a base liquid, and is injected into the base liquid.

On the other hand, when an electric current stops being passed through the coil 32 of the solenoid 28, the magnetic field generated in the coil 32 disappears, and the magnetic attracting force acting on the movable iron core 33 disappears. Therefore, as shown in FIG. 6, the movable iron core 33 is downwardly moved by the spring force of the coil spring 34. In association with the movement of the movable iron core 33, the slidable sealing member 21 downwardly moves while sliding on the first end surface 3 of the fixed flowpath forming member 1 and on the second end surface 9 of the movable flowpath forming member 7 by means of the connection member 35 and the holding plate 20, and, when the upper end of the positioning hole 26 of the holding plate 20 comes into contact with the positioning pin 27, the slidable sealing member 21 stops moving, and is returned to the retreated bottom position, i.e., to the original position as shown in FIGS. 6 and 9.

As described above, the injection valve according to this embodiment is structured to include the fixed flowpath forming member 1 that has the first end surface 3 and the first flowpath 2 formed of the first base flowpath 2A and the first sample flowpath 2B and in which one end of the first flowpath 2 is opened at the first end surface 3, the attachment member 5 that has the housing hole 6 at its part facing the first end surface 3 and that is attached to the fixed flowpath forming member 1 from the side of the first end surface 3, the movable flowpath forming member 7 that has an external shape substantially coinciding with the shape of the housing hole 6, that is housed in the housing hole 6 so as to be slidable in a direction perpendicular to the first end surface 3, and that has the second end surface 9 facing the first end surface 3 in a parallel manner and the second flowpath 13 formed of the second base flowpath 13A and the second sample flowpath 13B, the slidable sealing member 21 that is disposed between the first end surface 3 and the second end surface 9, that is slidable both on the first end surface 3 and on the second end surface 9, and that has the first seal sliding surface 22 being in slidable contact with the first end surface 3, the second seal sliding surface 23 being in slidable contact with the second end surface 9, and the third flowpath formed of the third flowpaths 24A and 24B each of which has one end opened at the first seal sliding surface 22 and the other end opened at the second seal sliding surface 23, and the coil spring 18 serving as a spring member that presses the movable flowpath forming member 7 so that the second end surface 9 of the movable flowpath forming member 7 is tightly pressed against the second seal sliding surface 23 of the slidable sealing member 21.

Additionally, the solenoid 28 is provided to serve as an actuator that drives the slidable sealing member 21, and has the coil spring 34 serving as an elastic return member. The solenoid 28 holds the slidable sealing member 21 in the original position by means of an urging force of the coil spring 34 during non-application of an electric current, whereas the solenoid 28 rectilinearly moves the slidable sealing member 21 to a predetermined position while resisting the urging force of the coil spring 34 during application of an electric current.

When an electric current is not passed through the solenoid 28, the injection valve allows the first base flowpath 2A and the second base flowpath 13A to communicate with each other through the third flowpath 24A, and allows the first sample flowpath 2B and the second sample flowpath 13B to communicate with each other through the third flowpath 24B. When an electric current is passed through the solenoid 28, the injection valve allows the first base flowpath 2A and the second base flowpath 13A to communicate with each other through the third flowpath 24B, and, as a result, a predetermined amount of sample liquid contained in the third flowpath 24B is injected into a base liquid. On the other hand, the space between the first sample flowpath 2B and the second sample flowpath 13B is blocked up.

Thus, according to the position of the slidable sealing member 21 based on application or non-application of an electric current onto the solenoid 28, a communication pattern is set among the first base flowpath 2A and the first sample flowpath 2B of the first flowpath 2, the third flowpaths 24A and 24B, and the second base flowpath 13A and the second sample flowpath 13B of the second flowpath 13.

In the injection valve according to this embodiment, the movable flowpath forming member 7 is pressed by the coil spring 18, and therefore the load of the slidable sealing member 21 received from the movable flowpath forming member 7 becomes equal to a constant spring load determined by the coil spring 18, and it is possible to easily mass-produce the injection valve having stable, constant performance.

Additionally, the movable flowpath forming member 7 has a shape substantially coinciding with the shape of the housing hole 6 of the attachment member 5 and is housed in the housing hole 6 so as to be slidable in a direction perpendicular to the first end surface 3 of the fixed flowpath forming member 1, and therefore the load distribution can be uniformed in the first seal sliding surface 22 and the second seal sliding surface 23 of the slidable sealing member 21. Additionally, the third flowpaths 24A and 24B are formed to follow one direction so as to reach the second seal sliding surface 23 from the first seal sliding surface 22, and therefore the pressure loss of a fluid can be minimized.

Additionally, the fixed flowpath forming member 1 has the first projection 4 that protrudes toward the movable flowpath forming member 7 and on which the first end surface 3 is formed. The movable flowpath forming member 7 has the second projection 10 that protrudes toward the first projection 4 and on which the second end surface 9 is formed. The first end surface 3 and the second end surface 9 are smaller in area than the first seal sliding surface 22 and the second seal sliding surface 23, respectively, and excellently maintain a state of slidable contact with the first seal sliding surface 22 and with the second seal sliding surface 23, respectively, during a rectilinear movement of the slidable sealing member 21. Therefore, the load distribution can be uniformed in the first seal sliding surface 22 and the second seal sliding surface 23, and it is possible to use the coil spring 18 having a comparatively small elastic urging force, and the life of the valve can also be prolonged.

Although the coil spring 18 is used as a spring member in the above-mentioned embodiment, a leaf spring whose basal part is fixed to the attachment member 5 may be used instead of the coil spring, and may press the movable flowpath forming member 7 against the slidable sealing member 21 in the same way as the coil spring.

Additionally, although the solenoid 28 is used as an actuator in each embodiment mentioned above, the present invention is not limited to this. The present invention can also be easily applied to an air-driven slide type valve that uses an air drive apparatus, instead of the solenoid.

What is claimed is:

1. A slide type valve comprising:
   a fixed flowpath forming member, the fixed flowpath forming member having a first end surface and a first flowpath formed of at least one flowpath, one end of the first flowpath being opened at the first end surface;
   an attachment member, the attachment member having a housing hole at a part of the attachment member facing the first end surface, the attachment member being attached to said fixed flowpath forming member from a side of the first end surface;
   a movable flowpath forming member, the movable flowpath forming member having an external shape substantially coinciding with a shape of the housing hole, said movable flowpath forming member being housed in the housing hole so as to be slidable in a direction perpendicular to the first end surface, said movable flowpath forming member additionally having a second end surface facing the first end surface in a parallel manner and a second flowpath formed of at least one flowpath;
   a slidable sealing member, the slidable sealing member being disposed between the first end surface and the second end surface, the slidable sealing member being slidable both on the first end surface and on the second end surface, the slidable sealing member having a first seal sliding surface being in slidable contact with the first end surface, a second seal sliding surface being in slidable contact with the second end surface, and a third flowpath formed of at least one flowpath one end of which is opened at the first seal sliding surface and an opposite end of which is opened at the second seal sliding surface;
   a spring member, the spring member pressing said movable flowpath forming member so that the second end surface of said movable flowpath forming member is tightly pressed against the second seal sliding surface of said slidable sealing member; and
   an actuator, the actuator rectilinearly moving said slidable sealing member between an original position and a predetermined position;
   wherein a communication pattern among the first flowpath, the third flowpath, and the second flowpath is set according to a position of said slidable sealing member, and
   wherein said fixed flowpath forming member is provided with a first base flowpath to be connected to a first base port and a first sample flowpath to be connected to the first sample port, both of the first base flowpath and the first sample flowpath serving as the first flowpath;
   said movable flowpath forming member is provided with a second base flowpath to be connected to a second base port and a second sample flowpath to be connected to a second sample port, both of the second base flowpath and the second sample flowpath serving as the second flowpath;
   said slidable sealing member is provided with a third flowpath capable of communicating with the first base flowpath and communicating with the second base flowpath, whereas the slidable sealing member is provided with another third flowpath capable of communicating with the first sample flowpath and communicating with the second sample flowpath; and
   when said slidable sealing member is slid by actuator driving, the first sample flowpath and the second sample flowpath stop communicating with each other, whereas the first base flowpath and the second base flowpath are connected together and communicate with each other through the another third flowpath located between the first base flowpath and the second base flowpath.

2. The slide type valve according to claim 1, wherein said fixed flowpath forming member has a first projection that protrudes toward said movable flowpath forming member,
   the first end surface is formed on the first projection,
   said movable flowpath forming member has a second projection that protrudes toward the first projection,
   the second end surface is formed on the second projection,
   the first end surface and the second end surface are smaller in area than the first seal sliding surface and the second seal sliding surface, respectively, and
   the first end surface and the second end surface maintain a state of slidable contact with the first seal sliding surface and with the second seal sliding surface, respectively, during a rectilinear movement of the slidable sealing member.

* * * * *